United States Patent [19]

Keil

[11] Patent Number: 4,623,694

[45] Date of Patent: Nov. 18, 1986

[54] CURABLE ORGANOSILOXANE COMPOSITIONS CONTAINING AN EMULSIFIED EPOXIDE COMPOUND AND ELASTOMERIC MATERIALS PREPARED THEREFROM

[75] Inventor: Joseph W. Keil, Midland, Mich.

[73] Assignee: Dow Corning Corporation, Midland, Mich.

[21] Appl. No.: 804,220

[22] Filed: Nov. 18, 1985

[51] Int. Cl.$^4$ ................................................ C08K 5/24
[52] U.S. Cl. .................................... 524/731; 524/788; 524/860; 528/21; 528/25; 528/33
[58] Field of Search ....................... 524/731, 788, 860; 528/21, 25, 33

[56] References Cited

U.S. PATENT DOCUMENTS

| | | | |
|---|---|---|---|
| 2,819,245 | 1/1958 | Shorr | 260/42 |
| 2,843,560 | 7/1958 | Mika | 260/42 |
| 3,926,885 | 12/1975 | Keil | 260/29.1 SB |
| 3,959,203 | 5/1976 | Keil | 260/29.1 SB |
| 3,971,747 | 7/1976 | Bank et al. | 260/37 SB |
| 4,011,189 | 3/1977 | Keil | 260/33.6 UB |
| 4,087,478 | 5/1978 | Keil | 260/825 |
| 4,332,923 | 6/1982 | Rainear | 525/507 |

*Primary Examiner*—Melvyn I. Marquis
*Attorney, Agent, or Firm*—Robert Spector

[57] ABSTRACT

This invention relates to oil-in-oil emulsions wherein the continuous phase comprises at least one carboxyalkyl terminated polydiorganosiloxane and the dispersed phase comprises at least one epoxide compound selected from diglycidyl ethers of di- and bis-phenols. The emulsions also include a curing catalyst in addition to an dispersing agent for the epoxide compound, and can be cured with heating to form elastomeric materials exhibiting properties characteristics of silicone rubber.

10 Claims, No Drawings

CURABLE ORGANOSILOXANE COMPOSITIONS CONTAINING AN EMULSIFIED EPOXIDE COMPOUND AND ELASTOMERIC MATERIALS PREPARED THEREFROM

BACKGROUND OF THE INVENTION

1. Field of the Invention

This invention relates to curable liquid organosiloxane compositions. More particularly, this invention relates to emulsions wherein the continuous phase comprises at least one carboxyalkyl terminated polydimethylsiloxane and the dispersed phase comprises at least one epoxide compound selected from diglycidyl ethers of di- and bis-phenols. The emulsions also include a curing catalyst in addition to a dispersing agent for the epoxide compound, and can be cured with heating to form elastomeric materials.

2. Background Information

The copolymerization of organic compounds containing two or more epoxide groups with organosilicon compounds having a plurality of epoxide-reactive groups has been disclosed as a means for preparing materials ranging from resins to elastomers.

The reaction of epoxide compounds with organosilicon compounds containing at least one hydroxyl group per molecule under anhydrous conditions and in the presence of an aluminum-containing catalyst is described in U.S. Pat. No. 3,971,747, which issued to Banks et al. on July 27, 1976.

The reaction of epoxide compounds with organosiloxanes containing various epoxide-reactive functional groups to yield resinous products is disclosed in U.S. Pat. No. 2,819,245, which issued to Shorr on Jan. 7, 1958, and in U.S. Pat. No. 2,846,560, which issued to Mika on July 15, 1958.

Coating compositions containing from 35 to 85 percent by weight of an epoxide compound, such as diglycidyl ethers of difunctional alcohols or cycloaliphatic epoxide compounds, from 15 to 65 percent by weight of a specified group of hydroxyl-containing polyorganosiloxanes and a catalytically effective amount of a chelated aluminum compound are disclosed in U.S. Pat. No. 4,332,923 that issued to Rainear on June 1, 1982. This patent also teaches that if the desired epoxide compound(s) and polyorganosiloxane(s) are immiscible, the composition can be in the form of an oil-in-oil emulsion that includes a surfactant of the type described in U.S. Pat. No. 3,926,885, which issued to Keil on Dec. 16, 1975. The Keil patent concerns self-lubricating epoxide compositions wherein the lubricant is incompatible with the epoxide compound and is present as a dispersed phase in a matrix of the epoxide compound. The dispersed phase is stabilized using specified classes of dispersing agents. Liquid polydimethylsiloxanes constitute a preferred class of lubricants.

One type of dispersing agent disclosed in the Keil patent is a polydimethylsiloxane-organic copolymer wherein the polydimethylsiloxane portion has a molecular weight of at least 1500 and preferably constitutes from 9 to 91 percent by weight of the dispersing agent. The organic portion consists essentially of polyoxyethylene units, polyoxypropylene units, or a combination of these two units.

In accordance with the present invention, it has been found that polydimethylsiloxane-organic copolymers containing repeating units of the types described in the aforementioned Keil patent, but wherein the concentration of organic units is above the disclosed limit of 91 weight percent, are one of two classes of dispersing agents that will stabilize oil-in-oil emulsions wherein the dispersed phase is an epoxide compound and the continuous phase is a liquid carboxy functional polydiorganosiloxane containing at least 95 mole percent of dimethylsiloxane units. Because the polyorganosiloxane rather than the epoxide is the continuous phase, the properties of the cured compositions are characteristic of silicone rubber rather than the resinous epoxide products obtained by following the teaching of the Keil patent. Unlike moisture-curable polyorganosiloxane compositions, the compositions of this invention can be completely cured in any thickness.

SUMMARY OF THE INVENTION

This invention provides curable oil-in-oil emulsions wherein the continuous phase comprises a carboxyalkyl terminated polydimethylsiloxane and the dispersed phase comprises a liquid diglycidyl ether of a di- or bis-phenol. The emulsion is stabilized by the presence of either an organosiloxane/oxyalkylene copolymer or the reaction product of (1) a copolymer containing SiO and trimethylsiloxy units and (2) a polymer consisting essentially of monoorganosiloxane units, and includes an effective amount of a curing catalyst.

DETAILED DESCRIPTION OF THE INVENTION

The curable liquid compositions of this invention are oil-in-oil emulsions comprising I. a continuous phase comprising from 25 to 95 percent, based on the weight of said composition, of a liquid, carboxyalkyl terminated polydiorganosiloxane containing an average of from 100 to 750 diorganosiloxane units per molecule, wherein at least 90 mole percent of said units are dimethylsiloxane, any remaining diorganosiloxane units being of the general formula $R_2SiO$, and terminal units of the general formula $HOOCR'—$, where each R is individually selected from the group consisting of alkyl containing from 2 to 12 carbon atoms, haloalkyl containing from 1 to 3 carbon atoms and phenyl and R' represents an alkylene radical containing from 2 to 20 carbon atoms;

II. a dispersed phase comprising from 2.5 to 70 percent, based on the weight of said Composition, of a liquified epoxide compound selected from the group consisting of diglycidyl ethers of di-and bis-phenols;

III. an amount sufficient to stabilize said emulsion of a solubilized dispersing agent consisting essentially of a polyorganosiloxane selected from the group consisting of (1) organosiloxane copolymers obtained by reacting (a) from 60 to 95 percent by weight of a first copolymer consisting essentially of from 45 to 72 mole percent $SiO_2$ units and from 28 to 55 mole percent of $(CH_3)_3SiO_{\frac{1}{2}}$ units, and (b) from 5 to 40 percent by weight of a second copolymer consisting essentially of identical or different units of the formula $R''SiO_{3/2}$, where $R''$ is selected from the group consisting of alkyl containing from 1 to 4 carbon atoms and phenyl, and (2) block copolymers comprising at least one segment consisting essentially of diorganosiloxane units of the general formula $R'''_2SiO$ where $R'''$ represents methyl, ethyl or vinyl and at least 95 percent of the diorganosiloxane units are polydimethylsiloxane, and at least one segment consisting essentially of one or more units of the general formula $R''''YSiO$ or Z, where $R''''$ is selected from the same group as R''', Y represents a monovalent polyoxyalkylene radical, Z represents a divalent polyoxyalkylene radical, Y and Z are bonded to the block copolymer by means of silicon-to-carbon or silicon-to-oxygen bonds, exhibit a molecular weight of at least 1000, and consist essentially of from 50 to 100 mole percent of polyoxyethylene units, the remaining 0 to 50 mole percent being polyoxypropylene units, and the molar ratio of diorganosiloxane units to R'''' YSiO or Z units is from 400 to 800; and IV. an amount of a liquid or solubilized catalyst sufficient to promote curing of said composition.

A characterizing feature of the present compositions is the dispersing agent that maintains the epoxide compound(s) as a uniformly dispersed phase until the composition is cured. These dispersing agents are organosiloxane copolymers selected from two major classes.

One class of dispersing agent, referred to hereinafter as Type 1, contains the same repeating units as one of the dispersing agents described in the Keil patent referred to hereinabove, but at different relative concentrations. Specifically, the Type 1 dispersing agents are copolymers containing diorganosiloxane units, at least 95 percent of which are dimethylsiloxane units, and oxyalkylene units that can be oxyethylene or a combination of oxyethylene with up to 50 mole percent, based on total oxyalkylene units, of oxypropylene units.

The diorganosiloxane units are represented by the general formula $R'''_2 SiO$ where R''' represents methyl, ethyl or vinyl. At least 95 mole percent of the R'''' radicals are methyl. Preferably all of the diorganosiloxane units are dimethylsiloxane.

The oxyalkylene units are bonded together to form monovalent or divalent radicals represented by Y and Z, respectively, in the foregoing formulae. The molecular weights of the Y and Z radicals are at least 1000, and preferably between 1500 and 3000. The oxyalkylene radicals are bonded to the silicon atoms of the Type 1 dispersing agent by means of silicon-oxygen or silicon-carbon bonds, and the silicon atoms to which these radicals are bonded are also bonded to a R'''' radical, where R'''' can be methyl, ethyl or vinyl as defined hereinabove for R'''.

In order to maintain the carboxyalkyl end blocked polydimethylsiloxane as the continuous phase, the molar ratio of diorganosiloxane units to the aforementioned Y or Z radicals in the Type 1 dispersing agent must be from 400 to 800. This concentration range is equivalent to a weight percentage that is considerably above the upper limit of 91 percent disclosed in the Keil patent referred to hereinbefore.

Methods for preparing diorganosiloxane-oxyalkylene copolymers corresponding to the Type 1 emulsifier are known. A preferred method is described in the accompanying examples, and employs the reaction of a dimethylsiloxane/methylhydrogensiloxane copolymer with an oxyalkylene polymer having one ethylenically unsaturated terminal unit per molecule. The organohydrogensiloxane copolymer preferably contains from 400 to about 600 repeating units per molecule.

The second type of dispersing agent, referred to herein as Type 2, is described in U.S. Pat. No. 4,087,478, which issued to Joseph Keil on May 2, 1978. The Type 2 dispersing agents are copolymeric reaction products consisting essentially of (a) from 60 to 95 percent by weight of a first copolymer consisting essentially of from 45 to 72 mole percent $SiO_2$ units and from 28 to 55 mole percent of $(CH_3)_3SiO_{\frac{1}{2}}$ units and (b) from 5 to 40 percent by weight of a second copolymer consisting essentially of identical or different units of the formula $R'' SiO_{3/2}$, where R'' is selected from the group consisting of alkyl containing from 1 to 4 carbon atoms and phenyl. Preferably the R'' $SiO_{3/2}$ radicals are a combination of phenylsiloxane and propylsiloxane radicals. Most preferably the majority of the R'' radicals are phenyl.

The concentration of dispersing agent required to stabilize the emulsified epoxide compound is dependent upon several variables, including the type and relative concentration of epoxide compound. Typically a minimum of about 1 percent, based on the weight of the curable composition, is required to stabilize the dispersed phase, concentrations of from 1 to 10 percent being preferred.

The molecular weights of the Type 1 and Type 2 dispersing agents are not considered critical to the stability of the present emulsions, so long as these agents can be dispersed in the carboxyalkyl end blocked polydiorganosiloxane that forms the continuous phase of the present compositions and the relative concentrations of the various units in the copolymers are within the limits specified hereinbefore.

The continuous phase of the present compositions comprises at least one liquid carboxyalkyl terminated polydiorganosiloxane wherein at least 90 mole percent of the diorganosiloxane units are dimethylsiloxane and the terminal units are of the general formula HOOCR'—, where R' represents an alkylene radical containing from 1 to 20 carbon atoms. Any diorganosiloxane units other than dimethylsiloxane are represented by the general formula $R_2SiO$, where each R is individually selected from alkyl containing from 2 to 12 carbon atoms, haloalkyl containing from 1 to 3 carbon atoms and phenyl. R is preferably phenyl or 3,3,3-trifluoropropyl, based on the availability of the corresponding starting materials used to prepare the polydiorganosiloxane, and R' preferably contains from 10 to 15 carbon atoms.

The carboxyalkyl terminated polydiorganosiloxane contains an average of from 100 to 750 diorganosiloxane units per molecule. The physical properties of elastomers obtained from compositions wherein the continuous phase polymer contains fewer than 100 diorganosiloxane units per molecule are not considered commercially useful, and polymers containing more than about 750 diorganosiloxane units per molecule are difficult to process in conventional mixing equipment.

Methods for preparing carboxyalkyl end blocked polydiorganosiloxanes are described in the prior art, and do not form part of this invention. A preferred class of polymers can be prepared by reacting an ethylenically unsaturated carboxylic acid containing from 3 to 20 carbon atoms, such as undecylenic acid, with a source of triorganosiloxy groups such as hexamethyldisilazane to convert the carboxyl group of the acid to a triorganosilylcarboxy group. This product (A) is reacted with a diorganohydrogensiloxy terminated polydiorganosiloxane under conditions which hydrolyze the triorganosilylcarboxy group and yield a carboxyalkyl terminated polydiorganosiloxane. Alternatively, (A) can be hydrosilated using a reactant such as sym-tetramethyldisiloxane and the resultant product reacted with a cyclic diorganosiloxane oligomer.

The continuous phase of the present compositions constitutes from 25 to about 97 percent by weight of the composition. The accompanying examples demonstrate that compositions containing preferred reactants do not cure completely when the concentration of carboxyalkyl end blocked polydiorganosiloxane is above about 97 weight percent and the concentration of epoxide compound is below about 3 percent by weight.

The dispersed phase of the present compositions comprises at least one diglycidyl ether of a di-or bisphenol. Epoxide compounds of this type are well known, and are typically prepared by reacting a difunctional phenol with an epoxide compound such as epichlorohydrin that contains a substituent which reacts with phenolic hydroxyl groups. The phenol reactant can be a mononuclear compound such as catechol or a polynuclear aromatic compound such as one of the isomeric dihydroxynaphthalenes. Alternatively, the phenol reactant can be a bis-phenol wherein two monohydroxylated phenylene radicals are joined by an lower alkylene radical such as methylene or 2,2-propylene. A preferred epoxide compound is the diglycidyl ether of Bis- phenol A, a common name for the diglycidyl ether of 2,2-bis(4,4'-dihydroxyphenyl)propane.

The aforementioned epoxide compounds are available in monomeric form and as oligomeric condensation products ranging in viscosity from pourable liquids at room temperature to solid materials that liquify when heated. Any of these epoxide compounds are suitable for use as the dispersed phase of the present compositions, so long as they are liquid at the temperature at which the composition is prepared and cured. To facilitate preparation of the composition, the epoxide compound is preferably a liquid at room temperature.

The epoxide compound(s) present in the dispersed phase of the present compositions constitute from about 3 to 70 percent by weight of the composition.

Curing of the present compositions upon heating is facilitated by a suitable catalyst. Operable catalysts include secondary and tertiary amines. For reasons not presently understood, primary amines do not appear to be effective curing catalysts. The accompanying examples demonstrate that this is apparently true even when a combination of primary together with secondary and/or tertiary amino groups are present in the same molecule.

Alkali metal hydroxides such as potassium hydroxide and tin oompounds such as stannous octoate will cause the present compositions to cure, although the physical properties of the resultant elastomer appear inferior to those exhibited by compositions cured in the presence of the preferred amine catalysts. Preferred catalysts include alkanolamines such as diethanolamine and heterocyclic amines such as piperidine.

The concentration of amine or other catalyst that will effectively promote curing of the present compositions is dependent at least in part on the activity of the catalyst and the temperature at which it is desired to cure the composition. Typically this concentration will be from about 0.01 to about 5 percent, based on the total weight of the curable composition.

In addition to the ingredients described hereinbefore the present compositions can contain other materials typically employed in polyorganosiloxane elastomers. These optional materials include but are not limited to reinforcing and nonreinforcing fillers, such as fume silica, precipitated silica, quartz and calcium carbonate; pigments such as carbon black and iron oxide; heat and ultraviolet stabilizers; and flame retardants. When fillers are present, they preferably constitute from 10 to about 50 percent by weight of the composition.

The present curable compositions can be prepared using any of the known preparative methods for emulsions. Small amounts of materials can be mixed by hand, however use of motor driven mixers and homogenizers may be preferable when processing relatively large quantities of ingredients, particularly if fillers are included.

Many of the present compositions will begin to gel at room temperature once the two reactants and catalyst are combined. It should therefore be understood that these compositions cannot be stored for extended periods without undergoing a substantial increase in viscosity and ultimate gelation. If storage stability is desired the compositions can be prepared in two parts. One part can contain the carboxyalkyl terminated polydiorganosiloxane, curing catalyst and dispersing agent, while the second part includes the epoxide compound. Other combinations of ingredients may also provide the desired storage stability.

As discussed hereinbefore, the present compositions yield cured, elastomeric materials that exhibit many of the desirable properties characteristic of silicone rubbers. The dispersed epoxide appears to function as a reinforcing filler, as evidenced by the superior tensile properties of the cured elastomer relative to unreinforced silicone rubber. The epoxide compound also improves the adhesion of the elastomer to metals such as aluminum.

The present compositions offer a substantial advantage over moisture cured silicone rubber in their ability to cure in relatively thick sections. The compositions can therefore be used as molding materials and applied as coatings in any desired thickness. While some types of polyorganosiloxane compositions have a similar advantage, they have shortcomings in terms of poor physical properties of the cured elastomer or susceptibility to inhibition or inactivation of the platinum catalyst used in compositions curable by a hydrosilation reaction.

Preferred curable compositions of this invention are described in the following examples, which should not be interpreted as limiting the scope of the accompanying claims. Unless indicated otherwise, all parts and percentages stated in the examples are by weight and all viscosities were measured at 25° C.

EXAMPLE 1

This example describes the preparation and curing of an emulsion of this invention using a dimethylsiloxane-/methyloxyalkylenesiloxane copolymer as the emulsifying agent.

The emulsifying agent was prepared by heating a mixture containing 100 parts of a trimethylsiloxy end blocked dimethylsiloxane/methylhydrogensiloxane copolymer, 6.22 parts of an ethylene oxide/propylene oxide copolymer containing one terminal allyl radical and one terminal hydroxyl group per molecule and 26.5 parts of a saturated solution of sodium acetate in isopropanol. The trimethylsiloxy end blocked polymer exhibited a viscosity of 12.6 Pa.s at 25 C, which is equivalent to an average of about 540 dimethylsiloxane units per molecule, and contained a calculated average of 1.1 methylhydrogensiloxane units per molecule, based on the amounts of reactants used to prepare the copolymer. The alkylene oxide copolymer contained an average of 18 oxyethylene units and 18 oxypropylene units per molecule.

When the temperature of the reaction mixture reached the boiling point 0.05 part of a 0.1 molar solution of hexachloroplatinic acid in isopropanol was added and heating was discontinued. At the completion of the induction period, as evidenced by an increase in temperature of the reaction mixture, heating was continued for two hours, at which time the isopropanol was removed by distillation. The resultant copolymer contained a calculated average of one methyloxyalkylenesiloxane unit per molecule, and 540 dimethylsiloxane units, based on the calculated concentrations of methylhydrogensiloxane, dimethylsiloxane and trimethylsiloxy units present in the dimethylsiloxane/methylhydrogensiloxane copolymer used to prepare the emulsifying agent.

An emulsion was prepared by blending the following ingredients using a motor driven homogenizer:

67 parts of a carboxyalkyl end blocked polydimethylsiloxane (I) of the average formula

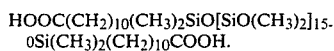

HOOC(CH$_2$)$_{10}$(CH$_3$)$_2$SiO[SiO(CH$_3$)$_2$]$_{15}$-
OSi(CH$_3$)$_2$(CH$_2$)$_{10}$COOH.

The acid number of this material (mg. of potassium hydroxide per gram of sample) was 10.06±0.5.

30 parts of a liquid diglycidyl ether of bis-phenol A (II) with an average degree of polymerization of 1 and 3 parts of the emulsifying agent (III) described in the preceding section of this example.

A curable composition of this invention was prepared by blending to homogeneity 100 parts of the resultant emulsion (A) with 1.8 parts of piperidine. This composition was then poured into a mold and cured by heating for 16 hours at a temperature of 100° C. The resultant opaque elastomeric material exhibited the following properties:

| Durometer Hardness (Shore A Scale) | 24 |
| Tensile Strength | 1504 KPa. |
| Elongation | 189% |

The curable composition contained 30 weight percent of the diglycidyl ether.

To determine the effect of lower diglycidyl ether concentrations on the physical properties of the cured material, emulsion A was combined with the same carboxyalkyl end blocked polydimethylsiloxane (I) used to prepare the composition and piperidine (IV) in the amounts shown in the following Table 1 and cured as described in the preceding section of this example. The physical properties of the cured materials also appear in Table 1, together with the weight percent of bis-phenol A diglycidyl ether (II) present in the curable composition. The concentrations of the various ingredients are expressed in parts by weight.

TABLE 1

| A | I | IV | % II | Durometer (Shore A) | Tensile Strength (KPa) |
|---|---|---|---|---|---|
| 33.3 | 66.7 | 0.6 | 10 | 12 | 476.1 |
| 16.7 | 83.3 | 0.3 | 5 | 1 | 372.6 |
| 8.3 | 91.7 | 0.15 | 2.5 | Composition did not cure. | |

EXAMPLE 2

This example describes a second type of emulsifying agent that can be used in the compositions of this invention.

The emulsifying agent is an organosiloxane copolymer of the type described in U.S. Pat. No. 4,087,478, which issued to Joseph Keil on May 2, 1978. The copolymer can be prepared as described in example 1 of this patent by reacting 85 parts of a solubilized resinous copolymer containing 53 mole percent SiO$_2$ units and 47 mole percent trimethylsiloxy units with 15 parts of a solubilized resinous copolymer containing 76 mole percent phenylsiloxy units and 24 mole percent propylsiloxy units. Methods for preparing both copolymers by hydrolysis of the corresponding chlorosilanes are described in the prior art and do not form part of this invention. The emulsifying agent was employed as a 50 weight percent solution in a trimethylsiloxy end blocked polydimethylsiloxane exhibiting a viscosity of 1×10$^{-5}$ m$^2$/sec. at 25° C.

A curable composition was prepared by blending to homogeneity 6 parts of the emulsifying agent described in the preceding paragraph with 64 parts of a carboxyalkyl end blocked polydimethylsiloxane and 30 parts of a diglycidyl ether of Bis-phenol A, referred to as I and II, respectively, in the preceding example 1, and 1.8 parts of piperidine. The resulting curable composition of this invention was deaired under reduced pressure, poured into a mold and cured by heating at a temperature of 100° C. for 16 hours. The cured material exhibited a durometer hardness, measured on the Shore A scale, of 30, a tensile strength of 1739 kPa. and an elongation of 230%.

EXAMPLE 3

This example demonstrates the incorporation of fillers into compositions of this invention.

The carboxyalkyl end blocked polydimethylsiloxane (I), diglycidyl ether of Bis-phenol A (II) and emulsifying agent (III) were the same ones used in the preceding example 1. Ninety parts of a mixture (B) containing 89% I, 10% II and 1% III were blended to homogeneity with 10 parts of fume silica having a surface area of about 250 square meters per gram that had been treated with a source of trimethylsiloxy groups. The resultant mixture was too stiff to be readily processible, and was therefore blended with an equal weight of I and 0.3% piperidine, based on the weight of the final uncatalyzed mixture. After being deaired under reduced pressure the resultant curable composition of this invention was poured into a mold and cured by heating it for 16 hours at a temperature of 100° C. The elastomeric cured product exhibited a tensile strength of 580 kPa.

A mixture containing 50 parts of the aforementioned mixture (B), 50 parts of finely divided calcium carbonate available under the trademark "Camel White" and 0.3 part piperidine was deaired under reduced pressure, poured into a mold and cured at 100° C. for 10 hours to yield an elastomeric cured product exhibiting a durometer hardness on the Shore A scale of 35 and a tensile strength of 1063 kPa.

EXAMPLE 4

This example describes two compositions of this invention containing higher molecular weight carboxyalkyl end blocked polydimethylsiloxane reactants and a different emulsifying agent than the composition described in the preceding Example 1.

Ten parts of the diglycidyl ether of Bis-phenol A referred to hereinabove as II and 0.6 part of piperidine were blended to homogeneity. Two parts of this mixture were combined and blended to homogeniety with 1) 7.8 parts of one of three different carboxyalkyl end blocked polydimethylsiloxanes having the same terminal unit as the polymer identified as I in the preceding example 1 and 2) 0.2 part of an emulsifying agent. One of the polydimethylsiloxanes (IA) contained an average of 700 dimethylsiloxane units per molecule and the second polydimethylsiloxane (IB) contained an average of 250 dimethylsiloxane units per molecule. A third composition of this invention was prepared using a polydimethylsiloxane (IC) having an average of 150 dimethylsiloxane units per molecule, the same as in Example 1.

The emulsifying agent was prepared using the same general procedure described in the preceding Example 1. One hundred parts of a trimethylsiloxy end blocked dimethylsiloxane/methylhydrogensiloxane copolymer containing a calculated average of two methylhydrogensiloxane units per molecule were reacted with 15.6 parts of the allyl terminated ethylene oxide/propylene oxide copolymer identified described in Example 1 using 29 parts of a saturated solution of sodium acetate in isopropanol and 0.04 part of a 0.1 molar solution of hexachloroplatinic acid in isopropanol. Following removal of the isopropanol the emulsifying agent exhibited a viscosity of 0.052 m$^2$/sec.

The three curable compositions were poured into shallow aluminum containers and heated at a temperature of 100° C. After about 16 hours the composition prepared using polydimethylsiloxane IA was soft and tacky and the composition prepared using polydimethylsiloxane IB was more completely cured. The composition prepared using polydimethylsiloxane IC cured in 30 minutes. All of the cured compositions exhibited excellent adhesion to the aluminum container in which they were cured.

EXAMPLE 5

This example describes a curable composition of this invention wherein the epoxide compound constitutes more than 50% by weight of the composition.

An uncatalyzed curable composition of this invention was prepared by blending the following ingredients to homogeneity.

26.5 parts of a carboxyalkyl terminated polydimethylsiloxane of the general formula disclosed in the preceding example 1 and containing an average of 100 dimethylsiloxane units per molecule, 3.5 parts of emulsifying agent III described in the preceding example 1, 70 parts of diglycidyl ether II described in the preceding Example 1, and 4.2 parts of piperidine.

This composition formed a cured elastomer in about 16 hours at room temperature. The elastomer exhibited a tensile strength of 2484 kPa, a durometer hardness of 90 on the Shore A scale and an elongation of 10%.

EXAMPLE 6

This example demonstrates the effect of emulsifying agent concentration on the physical properties of the cured elastomer. Two compositions (F and G) were prepared using ingredients I, II and III of the preceding Example 1. Composition F contained 68.5 parts of I, 30 parts II and 1.5 parts III. Composition G contained 64 parts I, 30 parts II and 6 parts III. Two curable compositions of this invention were prepared by blending 100 parts of F or G with 1.8 parts of piperidine. Each composition was then deaired under reduced pressure and cured by heating it for 16 hours at 100 C. The durometer hardness (D), tensile strength (T) and elongation (E) of the cured compositions are recorded in the following table.

| Composition | D (Shore A) | T (kPa) | E (%) |
| --- | --- | --- | --- |
| F | 20 | 1670 | 192 |
| G | 10 | 1670 | 274 |

EXAMPLE 7

This example demonstrates the inability of a polyfunctional amine containing both primary and secondary amino groups to cure an emulsion of this invention.

Three parts of a mixture containing 87.8 weight percent of the diglycidyl ether of Bis-phenol A identified as II in the preceding example 1 and 12.2 weight percent of tetraethylene pentamine, $H_2NCH_2CH_2(NHCH_2CH_2)_2NHCH_2CH_2NH_2$, was blended to homogeneity with 0.3 part of the emulsifying agent described in the preceding example 4 and 6.7 parts of a carboxyalkyl end blocked polydimethylsiloxane exhibiting the general formula disclosed in example 1, with the exception that the polymer contained an average of 250 dimethylsiloxane units per molecule and exhibited a viscosity of 1.86 Pa.s and an acid number of 6.0±0.3. The resultant composition was not cured after 16 hours at either room temperature or 100° C.

EXAMPLE 8

This example demonstrates the effect of several different catalysts on the curability of the present compositions. A composition of this invention was prepared by blending the following ingredients to homogeneity:

78 parts of a carboxyalkyl end blocked polydimethylsiloxane of the general formula depicted in the preceding example 1. The polymer contained an average of 250 dimethylsiloxane units per molecule and exhibited a viscosity of 1.74 Pa.s and an acid number of 5.8±0.3, 20 parts of the same diglycidyl ether of Bis-phenol A disclosed in the foregoing examples, and 2 parts of the emulsifying agent described in the foregoing example 1.

Samples of this composition were blended with about 5 percent by weight of (1) a solution containing about 12 percent by weight of potassium hydroxide in ethanol, (2) stannous octoate, (3) benzyldimethylamine and (4) phosphoric acid. All of the compositions were heated al 100° C. for the times and with the results shown in the following table.

| Catalyst | Time @ 100° C. (Hours). | Results |
| --- | --- | --- |
| 1 | 7 | Cured |
| 2 | 1 | Cured |
| 3 | 5 | Cured |
| 4 | 4 | Not cured |

EXAMPLE 9

This example compares the abilities of a composition of this invention and a polyorganosiloxane composition containing a polysilicate curing agent to cure in relatively thick sections.

A curable composition of this invention (H) was prepared by blending to homogeneity the following ingredients:

67 parts of a carboxyalkyl end blocked polydimethylsiloxane of the general formula depicted in example 1 hereinabove and containing an average of 250 dimethylsiloxane units per molecule. The polymer exhibited a viscosity of 2.0 Pa.s at 25° C. and an acid number of 5.6±0.28

30 parts of the same diglycidyl ether described in the foregoing examples 3 parts of the same emulsifying agent described in example 1 hereinabove, and A 20-gram portion of the resultant mixture was blended to homogeneity with 1 gram of pyrrolidone and placed in a 15 cc- capacity glass vial which was then capped using a piece of aluminum foil.

A polysilicate-curable polyorganosiloxane composition (I) was prepared by blending to homogeneity 20 grams of a hydroxyl end blocked polydimethylsiloxane exhibiting a viscosity of 2 Pa.s at 25° C., 0.8 gram of ethyl polysilicate and 0.08 gram of dibutyltin dilaurate. The resultant mixture was placed in a 15 cc-capacity glass vial that was capped with aluminum foil.

Both of the aforementioned vials were heated at 100° C. Composition (H) was completely cured after one hour. Composition (I) was still liquid after 6 hours. After 72 hours the entire composition (I) had gelled, but the portion at the bottom of the vial was still soft and tacky.

That which is claimed is:

1. A curable composition consisting essentially of an oil-in-oil emulsion comprising
   I. a continuous phase comprising from 25 to 95 percent, based on the weight of said composition, of a liquid, carboxyalkyl terminated polydiorganosiloxane containing an average of from 100 to 750 diorganosiloxane units per molecule, wherein at least 90 mole percent of said units are dimethylsiloxane, any remaining units being of the general formula $R_2SiO$, and terminal units of the general formula HOOCR'—, where each R is individually selected from the group consisting of alkyl containing from 2 to 12 carbon atoms, haloalkyl containing from 1 to 3 carbon atoms and phenyl and R' represents an alkylene radical containing from 1 to 20 carbon atoms;
   II. a dispersed phase comprising from 2.5 to 70 percent, based on the weight of said composition, of a liquified epoxide compound selected from the group consisting of diglycidyl ethers of di- and bis-phenols;
   III. an amount sufficient to stabilize said emulsion of a solubilized dispersing agent consisting essentially of a polyorganosiloxane selected from the group consisting of (1) organosiloxane copolymers obtained by reacting (a) from 60 to 95 percent by weight of a first copolymer consisting essentially of from 45 to 72 mole percent $SiO_2$ units and from 28 to 55 mole percent of $(CH_3)_3SiO_{\frac{1}{2}}$ units, and (b) from 5 to 40 percent by weight of a second copolymer consisting essentially of identical or different units of the formula $R''SiO_{3/2}$, where $R''$ is selected from the group consisting of alkyl containing from 1 to 4 carbon atoms and phenyl, and (2) block copolymers comprising at least one segment consisting essentially of diorganosiloxane units of the general formula $R'''_2SiO$ where $R'''$ represents methyl, ethyl or vinyl and at least 95 percent of the diorganosiloxane units are polydimethylsiloxane, and at least one segment consisting essentially of one or more units of the general formula $R''''YSiO$ or Z, where $R''''$ is selected from the same group as $R'''$, Y represents a monovalent polyoxyalkylene radical, Z represents a divalent polyoxyalkylene radical, Y and Z are bonded to the block copolymer by means of silicon-to-carbon or silicon-to-oxygen bonds, exhibit a molecular weight of at least 1000, and consist essentially of from 50 to 100 mole percent of polyoxyethylene units, the remaining 0 to 50 mole percent being polyoxypropylene units, and the molar ratio of diorganosiloxane units to $R''''YSiO$ or Z units is from 400 to 800; and
   IV. an amount of a liquid or solubilized catalyst sufficient to promote curing of said composition.

2. A composition according to claim 1 wherein R' contains from 10 to 15 carbon atoms and said carboxyalkyl terminated polydiorganosiloxane is a polydimethylsiloxane.

3. A composition according to claim 1 where said epoxide compound is a diglycidyl ether of a bis-phenol.

4. A composition according to claim 1 where the radicals represented by $R''SiO_{3/2}$ phenylsiloxy and propylsiloxy radicals.

5. A composition according to claim 1 where the oxyalkylene radical represented by Y contains substantially equimolar concentrations of oxyethylene and oxypropylene units.

6. A composition according to claim 1 where said catalyst is a secondary or tertiary organic amine.

7. A composition according to claim 6 where said amine is selected from the group consisting of diethanolamine, piperidine and benzyldimethylamine.

8. A composition according to claim 1 where said composition contains from 10 to 50 weight percent of a filler.

9. A composition according to claim 8 where said filler is fume silica or calcium carbonate.

10. A two-part composition which when blended together forms a curable oil-in oil emulsion comprising
    I. a continuous phase comprising from 25 to 95 percent, based on the weight of said composition, of a liquid, carboxyalkyl terminated polydiorganosiloxane containing an average of from 100 to 750 diorganosiloxane units per molecule wherein at least 90 mole percent of said units are dimethylsiloxane, any remaining diorganosiloxane units being of the general formula $R_2SiO$, and terminal units of the general formula HOOCR'—, where each R is individually selected from the group consisting of alkyl containing from 2 to 12 carbon atoms, haloalkyl containing from 1 to 3 carbon atoms and phenyl and R' represents an alkylene radical containing from 1 to 20 carbon atoms;
    II. a dispersed phase comprising from 2.5 to 70 percent, based on the weight of said composition, of a liquified epoxide compound selected from the group consisting of diglycidyl ethers of di- and bis-phenols;
    III. an amount sufficient to stabilize said emulsion of a solubilized dispersing agent consisting essentially of a polyorganosiloxane selected from the group consisting of (1) organosiloxane copolymers obtained by reacting (a) from 60 to 95 percent by weight of a first copolymer consisting essentially of from 45 to 72 mole percent $SiO_2$ units and from 28 to 55 mole percent of $(CH_3)_3SiO_{\frac{1}{2}}$ units, and (b) from 5 to 40 percent by weight of a second copolymer consisting essentially of identical or different units of the formula $R'' SiO_{3/2}$ where $R''$ is selected from the group consisting of alkyl containing from 1 to 4 carbon atoms and phenyl, and (2) block copolymers comprising at least one segment consisting essentially of diorganosiloxane units of the general formula $R'''_2SiO$ where $R'''$ represents methyl, ethyl or vinyl and at least 95 percent of the diorganosiloxane units are polydimethylsiloxane, and at least one segment consisting essentially of one or more units of the general formula $R''''YSiO$ or Z, where $R''''$ is selected from the same group as $R'''$, Y represents a monovalent polyoxyalkylene radical, Z represents a divalent polyoxyalkylene radical, Y and Z are bonded to the block copolymer by means of silicon-to-carbon or silicon-to-oxygen bonds, exhibit a molecular weight of at least 1000, and consist essentially of from 50 to 100 mole percent of polyoxyethylene units, the remaining 0 to 50 mole percent being polyoxypropylene units, and the molar ratio of diorganosiloxane units to $R''''YSiO$ or Z units is from 400 to 800; and IV. an amount of a liquid or solubilized catalyst sufficient to promote curing of said composition, where said liquid carboxyalkyl terminated polydiorganosiloxane and said liquified epoxide compound are in different parts of said composition.

* * * * *